(12) United States Patent
Tsai et al.

(10) Patent No.: US 6,930,157 B2
(45) Date of Patent: Aug. 16, 2005

(54) CATALYST COMPOSITION FOR PREPARING OLEFIN POLYMERS

(75) Inventors: Jing-Cherng Tsai, Kaohsiung (TW);
Ming-Yuan Wu, Nantou (TW);
Tung-Ying Hsieh, Taipei (TW);
Yuh-Yuan Wei, Hsinchu (TW);
Chao-Ying Yu, Kaohsiung (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 10/459,485

(22) Filed: Jun. 12, 2003

(65) Prior Publication Data

US 2003/0212221 A1 Nov. 13, 2003

Related U.S. Application Data

(60) Division of application No. 10/244,435, filed on Sep. 17, 2002, now Pat. No. 6,875,719, which is a continuation-in-part of application No. 09/559,976, filed on Apr. 27, 2000, now abandoned.

(51) Int. Cl.[7] .................................................. C08F 4/642
(52) U.S. Cl. ...................... 526/160; 526/134; 526/161; 526/172; 526/281; 526/308; 526/943
(58) Field of Search ................................ 526/134, 160, 526/161, 172, 281, 308, 943

(56) References Cited

U.S. PATENT DOCUMENTS

| | | | |
|---|---|---|---|
| 3,478,002 A | | 11/1969 | Nakaguchi et al. |
| 5,087,677 A | * | 2/1992 | Brekner et al. ............. 526/160 |
| 5,179,171 A | | 1/1993 | Minami et al. |
| 5,272,235 A | | 12/1993 | Wakatsuru et al. |
| 5,324,800 A | | 6/1994 | Welborn, Jr. et al. |
| 5,324,801 A | | 6/1994 | Brekner et al. |
| 5,334,677 A | * | 8/1994 | Razavi et al. ................ 526/114 |
| 5,348,926 A | | 9/1994 | Yamada et al. |
| 5,422,409 A | | 6/1995 | Brekner et al. |
| 5,428,098 A | | 6/1995 | Brekner et al. |
| 5,455,366 A | | 10/1995 | Rohrmann et al. |
| 5,491,205 A | | 2/1996 | Langhauser et al. |
| 5,496,902 A | | 3/1996 | Evertz et al. |
| 5,545,829 A | | 8/1996 | Brekner et al. |
| 5,552,504 A | | 9/1996 | Bennett et al. |
| 5,559,199 A | | 9/1996 | Abe et al. |
| 5,565,534 A | | 10/1996 | Aulbach et al. |
| 5,602,219 A | | 2/1997 | Aulbach et al. |
| 5,637,400 A | | 6/1997 | Brekner et al. |
| 5,646,220 A | | 7/1997 | Brekner et al. |
| 5,650,471 A | | 7/1997 | Abe et al. |
| 5,658,998 A | | 8/1997 | Minami et al. |
| 5,663,249 A | | 9/1997 | Ewen et al. |
| 5,733,991 A | * | 3/1998 | Rohrmann et al. .......... 526/160 |
| 5,770,666 A | | 6/1998 | Hamura et al. |
| 5,786,291 A | | 7/1998 | Speca et al. |
| 5,854,165 A | | 12/1998 | Yabunouchi et al. |
| 5,869,586 A | | 2/1999 | Riedel et al. |
| 6,020,444 A | | 2/2000 | Riedel et al. |
| 6,100,212 A | | 8/2000 | Wenzel |
| 6,121,402 A | * | 9/2000 | Machida et al. ............. 526/352 |
| 6,252,097 B1 | | 6/2001 | Sugano et al. |
| 6,339,134 B1 | * | 1/2002 | Crowther et al. ........... 526/128 |
| 6,342,568 B1 | * | 1/2002 | Sunaga et al. .............. 526/160 |
| 2002/0058766 A1 | * | 5/2002 | Crowther et al. ........... 526/160 |

FOREIGN PATENT DOCUMENTS

| | | |
|---|---|---|
| EP | 0 316 155 A2 | 5/1989 |
| EP | 0 610 843 A1 | 8/1994 |
| EP | 0 666 267 A2 | 8/1995 |
| EP | 0 955 305 A1 | 11/1999 |
| GB | 1019069 | 2/1966 |
| GB | 1223086 | 2/1971 |
| GB | 1294922 | 11/1972 |
| WO | WO 00/O1738 * | 1/2000 |
| WO | WO 00 68279 A | 11/2000 |

OTHER PUBLICATIONS

Alt et al., J. Organometallic Chem. 518 (1996) p. 7–15.*
"Syndiospezifische Polymerisation von Propylen . . . ", Helmut G. Alt, Roland Zenk, Journal of Organometallic Chemistry 518 (2996) 7–15.
"Preparation and X–ray structure of a novel chiral methylene bridged titanocen complex", Christopher A. Willoughby et al., Journal of Organometallic Chemistry 497 (1995) 11–15.
"$C_1$–Bridged fluorenylidene cyclopentadienylidene complexes of the type . . . ", Helmut G. Alt, Michael Jung, Journal of Organometallic Chemistry 568 (1998) 87–112.
Journal of Organometallic Chemistry, CH, Elsevier–Sequoia S.A. Lausanne, vol. 568, No. 1–2, Oct. 15, 1998, pp. 87–112, XP004146174.
Journal of Organometallic Chemistry, CH, Elsevier–Sequoia S.A. Lausanne, vol. 518, No. 1, Jul. 12, 1996, pp. 7–15, XP004035853.

* cited by examiner

Primary Examiner—Roberto Rabago
(74) Attorney, Agent, or Firm—Sughrue Mion, PLLC

(57) ABSTRACT

A catalyst composition for preparing olefin polymers. The catalyst composition includes a metallocene compound and an activating cocatalyst. In the metallocene compound, two cyclopentadienyl groups are bridged by X (carbon, silicon, germanium or tin) in a ring structure. The bite angle θ formed by the two cyclopentadienyl rings and X is equal to or greater than 100 degrees. The obtained olefin polymer has high cycloolefin conversion and a high glass transition temperature. In addition, the catalyst composition can still maintain relatively high activity at high temperature reaction conditions.

8 Claims, 5 Drawing Sheets

C(5)-C(6)-C(10) = 100.8°

C(5)-C(6)-C(9) = 100.44(12)°

C(14)-C(15)-C(5) = 101.0(6)°

C(35)-C(36)-C(30) = 99.8(8)°

C(5)-C(6)-C(12) = 97.3 (8)°

CATALYST COMPOSITION FOR PREPARING OLEFIN POLYMERS

CROSS REFERENCE TO RELATED APPLICATIONS

This application is a divisional of application Ser. No. 10/244,435, filed Sep. 17, 2000, now U.S. Pat. No. 6,875,719 the disclosure of which is incorporated herein by reference, and which is a continuation-in-part of application Ser. No. 09/559,976, filed on Apr. 27, 2000, now abandoned.

BACKGROUND OF THE INVENTION

1. Field of the Invention

The present invention relates to a catalyst composition for preparing olefin polymers, and more particularly to a catalyst composition for preparing cycloolefin copolymers with a high cycloolefin conversion and a high glass transition temperature. The catalyst composition can still maintain relatively high activity at high temperature reaction conditions.

2. Description of the Prior Art

Olefin-based polymers have been used in a wide range of applications. One group of commonly used olefin-based polymers is polyolefins, that is, homopolymers or copolymers of olefins. These polyolefin polymers are typically used in such applications as blow and injection molding, extrusion coating, film and sheeting, pipe, wire and cable.

An example of polyolefin is ethylene-propylene elastomer (ethylene-propylene rubbers, EPR). It has many end-use applications due to its resistance to weather, good heat aging properties and its ability to be compounded with large quantities of fillers and plasticizers. Typical automotive uses are radiator and heater hoses, vacuum tubing, weather stripping and sponge doorseals. Typical industrial uses are sponge parts, gaskets and seals.

Another group of commonly used olefin-based polymers is cycloolefin copolymers (COC). One of the examples is a copolymer of cycloolefin and ethylene, which has an extraordinarily high glass transition temperature compared with traditional polyolefins owing to its incorporation of cyclic monomers. Also, the polymer has high transparency in physical properties due to reduced crystallinity by the incorporation of cyclic monomers. The combination of light transparency, heat resistance, aging resistance, chemical resistance, solvent resistance, and low dielectric constant makes COC a valuable material that has attracted research activities in both academic and industrial sectors. Currently, ethylene/cycloolefin copolymers have been demonstrated to be a suitable material in the field of optical materials such as optical memory disks and optical fibers.

Ethylene/cycloolefin copolymers are usually prepared in the presence of metallocene/aluminoxane catalyst systems, as described in U.S. Pat. No. 5,559,199 (Abe et al.) and U.S. Pat. No. 5,602,219 (Aulbach et al.) In U.S. Pat. No. 5,559,199, metallocenes such as isopropylidene(cyclopentadienylmethylcyclopentadienyl)zirconium dichloride are disclosed. In U.S. Pat. No. 5,602,219, metallocenes such as dimethylsilyl-(1-indenyl)-cyclopentadienylzirconium dichloride are disclosed.

However, conventional processes for preparing ethylene-cycloolefin copolymers have some common problems. First, the conversion of the cycloolefin (or the incorporation of the cycloolefin) is too low. Second, the high incorporation of ethylene results in too low a glass transition temperature (Tg) of the copolymer.

To increase the conversion of the cycloolefin, a common technique is to increase the reaction temperature or reducing reaction pressure of ethylene. However, using this technique, the reactivity for the production of cycloolefin polymer will be reduced as the examples show in U.S. Pat. Nos. 5,602,219 and 5,559,199. Obviously, this technique will reduce the commercial feasibility for COC polymerization. Therefore, efforts to enhance the reactivity of catalyst for increasing the incorporation of cyclic olefins during the COC polymerization processes are highly desirable in the industrial applications.

SUMMARY OF THE INVENTION

An object of the present invention is to provide a catalyst composition for preparing olefin polymers, particularly for preparing ethylene/cycloolefin copolymers with high cycloolefin incorporation and a high Tg.

To achieve the above-mentioned object, the catalyst composition of the present invention catalyst composition for preparing an olefin polymer includes (a) a metallocene compound represented by formula (I) and (b) an activating cocatalyst.

Formula (I) has the structure

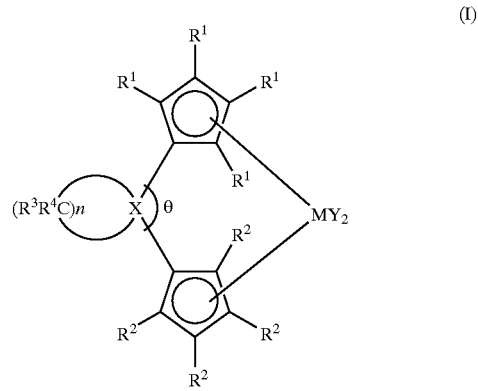

wherein
$R^1$ can be the same or different and is hydrogen, halogen, an alkyl, alkenyl, aryl, alkylaryl or arylalkyl group having from 1 to 20 carbon atoms, or two adjacent $R^1$ groups can link together with the carbon atoms to which they are attached to form a saturated or unsaturated ring system having from 4 to 20 carbon atoms;
$R^2$ can be the same or different and has the same definition as $R^1$;
X is carbon, silicon, germanium or tin;
n is 2 to 12;
$R^3$ and $R^4$ can be the same or different and are hydrogen, halogen, an alkyl, alkenyl, aryl, alkylaryl or arylalkyl group having from 1 to 12 carbon atoms;
M is a Group IVB transition metal with an oxidation state of +4;
Y is the same or different and is independently an anionic ligand with a −1 valence; and
the angle θ formed by the two cyclopentadienyl rings and X is equal to or greater than 100 degrees.

In formula (I), X is preferably carbon or silicon, and n is preferably 2, 3 or 4.

The activating cocatalyst can be (1) an aluminoxane, (2) a mixture of $AlR^{11}R^{12}R^{13}$ and a borate, or (3) a mixture of $AlR^{11}R^{12}R^{13}$ and an aluminoxane, wherein $R^{11}$, $R^{12}$, and $R^{13}$ are a $C_{1-20}$ aliphatic group or a $C_{6-10}$ aromatic group.

The catalyst composition of the present invention can be used to prepare an olefin polymer. Using the catalyst composition to prepare a cycloolefin copolymer, the cycloolefin incorporation is increased, and the copolymer obtained has a high glass transition temperature ranging from 60° C.–350° C.

DETAILED DESCRIPTION OF THE INVENTION

Figure 1:
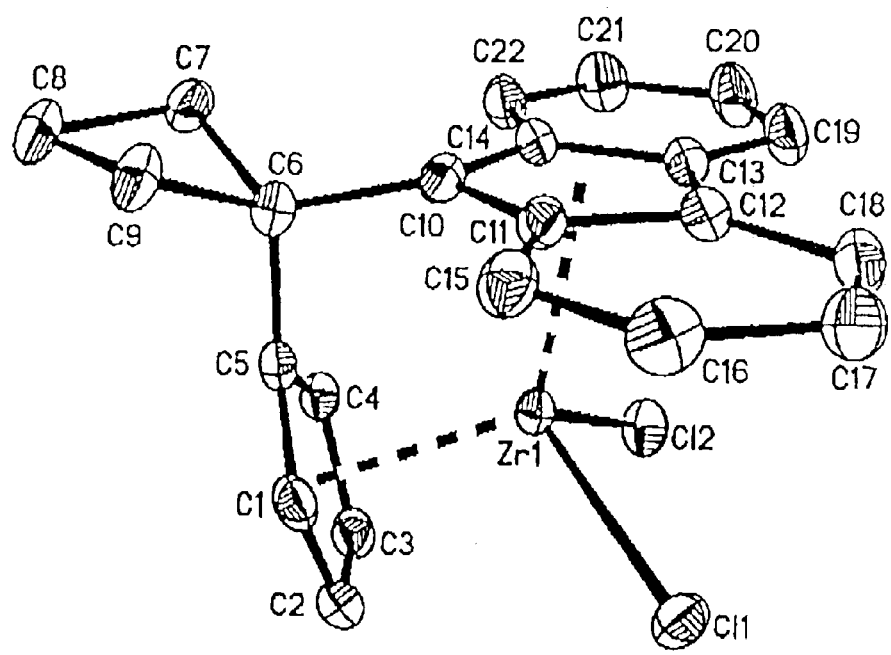
FIG. 1 is an X-ray crystal structure of the metallocene compound prepared from Catalyst Example 5 of the present invention.

The present invention provides a catalyst composition for preparing olefin polymers, which includes a metallocene compound represented by formula (I) and an activating cocatalyst.

One aspect of the present invention resides in that X (Group IVA element such as C) in formula (I) is bridged by —$(CR^3R^4)_n$— to form a three-, four-, or five-member ring structure, wherein n is 2, 3 or 4. Thus, the angle θ formed by the two cyclopentadienyl rings and X is equal to or greater than 100 degrees.

Referring to the conventional metallocenes for preparing cycloolefin copolymers in U.S. Pat. No. 5,559,199 (U.S. Pat. No. '199) and U.S. Pat. No. 5,602,219 (U.S. Pat. No. '219) as mentioned above, for example, isopropylidene (cyclopenta-dienylfluorenyl)zirconium dichloride and dimethylsilyl-(1-indenyl)cyclopentadienylzirconium dichloride, it can be seen that two methyl groups are bonded to the carbon or silicon atom of the metallocene. Part of the chemical structure of the metallocene is depicted in the Table 1 for better understanding, in which Cp indicates unsubstituted or substituted cyclopentadienyl, and $θ_1$, $θ_2$, and $θ_3$, indicate the angle formed by Cp, Group IVA element, and another Cp (Cp-IVA-Cp), which is called the bite angle.

TABLE 1

| U.S. '199 (bite angle's X-ray data, see Journal of Organometallic Chemistry 1995, 497, 105). | U.S. '219 (bite angle's X-ray data, see Organometallic 1994, 13, 964 and Journal of Organometallic Chemistry 1989, 369, 359). | Present invention (bite angle, see FIG. 1 and Table 2) vide infra |
|---|---|---|
| CH₃\C(Cp)(Cp)/CH₃, $θ_1$ = 98.4° | CH₃\Si(Cp)(Cp)/CH₃, $θ_2$ = 94.3~94.8° | $(R^3R^4C)_n$\C(Cp)(Cp), $θ_3$ = 100.8° |

In contrast with the metallocene of U.S. Pat. No. '199 and U.S. Pat. No. '219, the Group IVA element such as carbon is bridged by —$(CR^3R^4)_n$— (n=2, 3 or 4) to form a ring structure in the present invention. As a result of this bridging, the angle formed by Cp-IVA-Cp can be enlarged. That is to say, angle $θ_3$ is larger than both $θ_1$ and $θ_2$. It should be noted that to date, metallocene catalysts containing a bite angle larger than 100 degrees have never been reported from prior art.

When a conventional metallocene compound is used as a catalyst to prepare a copolymer of a cycloolefin and an acyclic olefin (such as ethylene), since the bite angle is is small, it is difficult for the cycloolefin that has a larger size than ethylene to approach the metallocene's active site. Thus, an undesired low incorporation amount of the cycloolefin occurs in the copolymer produced. However, when the metallocene compound of the present invention is used as the catalyst, the larger bite angle leads to a greater vacancy around the metallocene's active site. Thereby the larger sized cycloolefin has greater probability to approach the reactive site. Consequently, copolymers produced using the catalyst composition of the present invention tend to have a higher cycloolefin incorporation in the polymer backbone, thus significantly increasing their glass transition temperatures (Tg).

The scientific basis is explained as follows. In a bridged metallocene of the present invention, when the bite angle between two Cp rings opens up, the active center of the metal moves outward. This will substantially increase the ratio of the coordination speed of a cycloolefin to acyclic olefin monomer with the active center of the catalyst compared with other catalysts, which increases the ratio of the cycloolefin relative to acyclic olefin monomer incorporated in the resulting copolymer in turn. The Tg of the copolymer increases accordingly, and the polymerization activity also increases. It should be noted that in a bridged metallocene catalyst, the bite angle resulting from a carbon bridge is obviously larger than that from a silicon bridge. One reason is that the element radius of carbon (0.77 Å) is smaller than that of silicon (1.11 Å). The other reason is that the electronegativity of carbon (2.5) is larger than that of silicon (1.8), thus carbon-carbon has a far larger bonding energy than silicon-carbon. Therefore, when Cp is bridged with a group IVA element, the silicon bridge has a larger degree of deformation than carbon, resulting in a smaller bite angle.

In formula (I), when $R^1$ and $R^2$ are an alkyl, alkenyl, aryl, alkylaryl or arylalkyl group having from 1 to 20 carbon atoms, preferably from 1 to 15 carbon atoms, they are preferably $C_{1-10}$ alkyl, $C_{1-10}$ alkenyl, $C_{6-10}$ aryl, $C_{7-10}$ alkylaryl, and $C_{7-10}$ arylalkyl. Representative examples of $R^1$ and $R^2$ include H, methyl, ethyl, propyl, butyl, isobutyl, amyl, isoamyl, hexyl, 2-ethylhexyl, heptyl, octyl, vinyl, allyl, isopropenyl, phenyl, and tolyl.

When two adjacent $R^1$ (or $R^2$) groups link together with the carbon atoms to which they are attached to form a ring system having from 4 to 20 carbon atoms, preferably 4 to 6 carbon atoms, $R^1$ (or $R^2$) can form with the cyclopentadienyl moiety to which they are attached a saturated or unsaturated polycyclic cyclopentadienyl ring such as an indenyl, tetrahydroindenyl, fluorenyl or octahydrofluorenyl group. Representative examples of such rings include $η^5$-cyclopentadienyl, $η^5$-methylcyclopentadienyl, $η^5$-ethylcyclopentadienyl, $η^5$-propylcyclopentadienyl, $η^5$-tetramethylcyclopentadienyl, $η^5$-pentamethylcyclopentadienyl, $η^5$-n-butylcyclopentadienyl, indenyl, tetrahydroindenyl, fluorenyl, and octahydrofluorenyl.

Y can be H, a $C_{1-20}$ hydrocarbon group, a halogen, $C_{6-20}$ aryl, $C_{7-20}$ alkylaryl or arylalkyl, $C_{1-20}$ alkoxy, $C_{1-20}$ aryloxy, $NH_2$, $NHR^7$, $NR^7R^8$, $—(C=O)NH_2$, $—(C=O)NHR^9$, $—(C=O)NR^9R^{10}$, each of $R^7$, $R^8$, $R^9$ and $R^{10}$ being $C_{1-20}$ hydrocarbyl. Suitable Y groups include methyl, ethyl, phenyl, chlorine, bromine, methoxy, ethoxy, $—NH_2$, $—NH(CH_3)$, $—N(CH_3)_2$, $—N(C_2H_5)_2$, and $—N(C_3H_7)_2$.

In the present invention, the metallocene compound represented by formula (I) can be combined with an activating coatalyst to form a catalyst composition, which can be used for preparing olefin polymers.

The cocatalyst used in the present invention can be (1) an aluminoxane, (2) a mixture of $AlR^{11}R^{12}R^{13}$ and a borate, or (3) a mixture of $AlR^{11}R^{12}R^{13}$ and an alumoxane. $R^{11}$, $R^{12}$, and $R^{13}$ are a $C_{1-20}$ aliphatic group or a $C_{6-10}$ aromatic group. A preferred aluminoxane is methyl aluminoxane. Representative examples of $AlR^{11}R^{12}R^{13}$ include trimethyl aluminum, triethyl aluminum, tripropyl aluminum, trisopropyl aluminum, tributyl aluminum, and triisobutyl aluminum (TIBA). Representative examples of borates include N,N-dimethyl anilinium tetrakis(pentafluorophenyl)borate, triphenyl carbenium tetrakis(pentafluorophenyl)borate, trimethyl ammonium tetrakis(pentafluorophenyl)borate, ferrocenium tetrakis(pentafluorophenyl)borate, dimethyl ferrocenium tetrakis(pentafluorophenyl)borate, and silver tetrakis (pentafluorophenyl)borate.

Using the catalyst composition of the present invention, an olefin polymer can be synthesized. In the presence of a catalytically effective amount of the catalyst composition of the present invention under polymerizing conditions, an olefin monomer can be subjected to polymerization (homopolymerization), or at least one olefin monomer together with at least one other monomer can be subjected to polymerization (copolymerization).

According to the present invention, a preferred olefin is a cycloolefin. Preferably, the polymerization of the present invention is homopolymerization of a cycloolefin, or copolymerization of a cycloolefin and an acycloolefin.

Cycloolefins suitable for use in the present invention include a bicycloheptene, a tricyclodecene, a tricycloundecene, a tetracyclododecene, a pentacyclopentadecene, a pentacyclopentadecadiene, a pentacyclohexadecene, a hexacycloheptadecene, a heptacycloeicosene, a heptacyclohenecicosene, an octacyclodocosene, a nonacyclopentacosene, and a nonacyclohexacosene. Representative examples include norbornene, tetracyclododecene, dicyclopentadiene, and ethylidene norbornene.

Suitable acyclic olefins can be ethylene or α-olefins. Representative examples of α-olefins include those olefins having 3 to 12 carbon atoms, such as propylene, 1-butene, 1-pentene, 1-hexene, and 1-octene.

More particularly, the catalyst composition of the present invention can be advantageously used to prepare acylic olefin/cycloolefin copolymers, such as ethylene/cycloolefin copolymers. By means of the specific catalyst composition, the ethylene/cycloolefin copolymer obtained will have a high cycloolefin conversion and a high Tg.

By means of the specific catalyst composition of the present invention, the resulting olefin polymer has a glass transition temperature ranging from 60–350° C., preferably 120–350° C., most preferably 250–350° C.

The novel catalyst composition disclosed in the present invention can be used in slurry reactions, gas phase reactions, and solution polymerization reactions. According to the experimental results of the present invention, it can be proved that the specific catalyst composition of the present invention can still have superior activity at a higher reaction temperature. Such superior activity will lead to the increase of the cycloolefin incorporation amount, and the cycloolefin copolymer obtained will have an increased Tg, which can not be achieved by a conventional similar catalyst.

According to the present invention, representative examples of the metallocene compound of formula (I) include the following formulae:

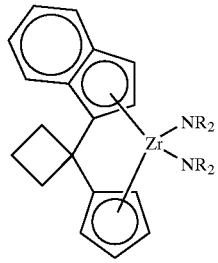

wherein R is a $C_1$–$C_{20}$ hydrocarbyl group,

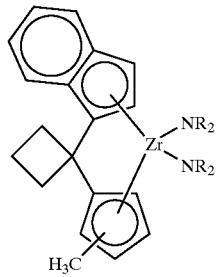

wherein R is a $C_1$–$C_{20}$ hydrocarbyl group,

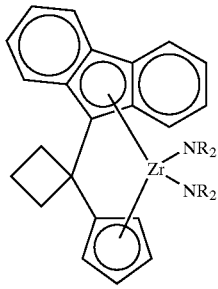

wherein R is a $C_1$–$C_{20}$ hydrocarbyl group,

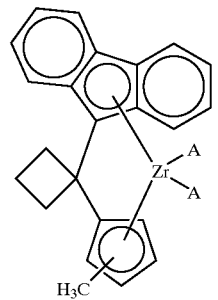

wherein A is halogen,

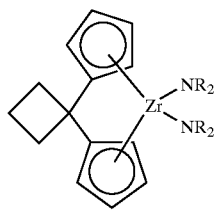

wherein R is a $C_1$–$C_{20}$ hydrocarbyl group,

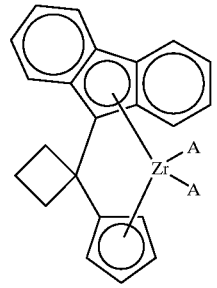

wherein R is a $C_{1-20}$ hydrocarbyl group,

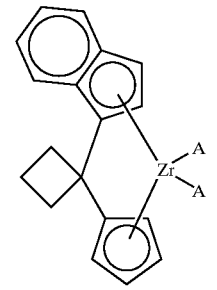

wherein A is halogen, and

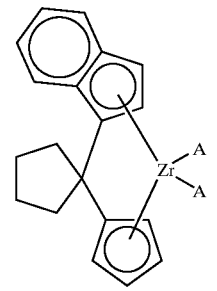

wherein A is halogen.

The following examples are intended to illustrate the process and the advantages of the present invention more fully without limiting its scope, since numerous modifications and variations will be apparent to those skilled in the art. Unless otherwise indicated, all parts, percents, ratios and the like are by weight.

Synthesis of Metallocene

CATALYST EXAMPLE 1

Synthesis of 1-cyclopentadienyl-1-indenylcyclobutane (a bridged cyclopentadiene)

Indene (5.8 g, 50 mmole) was placed in a 250 ml round bottom flask with 50 ml of THF (tetrahydrofuran). 40 ml (1.6 M, 64 mmole) of n-butyl lithium (n-BuLi) was is added into the solution under an ice bath. The mixture turned orange red. The ice bath was removed and the mixture was stirred for 3 hours. Then, the reaction mixture was stripped under vacuum to remove solvent, washed with 50 ml of pentane to remove excess n-BuLi, and filtered to collect the precipitate.

The precipitate was dissolved in 50 ml of THF and 6,6-trimethylenefulvene (5.9 g, 50 mmole) was added gradually to the solution under an ice bath. After stirring for 24 hours, 1 ml of water was added to the mixture to terminate the reaction. The reaction mixture was stripped under vacuum to remove solvent, dissolved with 100 ml of hexane, and filtered to collect the filtrate. The crude product (i.e., filtrate) was purified by column chromatography (the packing was 20 g of silica gel, the eluent was 100% hexane). The solution was then concentrated under reduced pressure to obtain a pale yellow liquid (8.2 g, yield=70%).

CATALYST EXAMPLE 2

Synthesis of 1-methylcyclopentadienyl-1-indenylcyclobutane

Indene (2.9 g, 25 mmole) was placed in a 250 ml round bottom flask with 30 ml of THF (tetrahydrofuran). 20 ml (1.6 M, 32 mmole) of n-butyl lithium (n-BuLi) was added into the solution under an ice bath. The mixture turned orange red. The ice bath was removed and the mixture was stirred for 3 hours. Then, the reaction mixture was stripped under vacuum to remove solvent, washed with 50 ml of pentane to remove excess n-BuLi, and filtered to collect the precipitate.

The precipitate was dissolved in 30 ml of THF and 3-methyl-6,6-trimethylenefulvene (3.3 g, 25 mmole) was added gradually to the solution under an ice bath. After stirring for 24 hours, 1 ml of water was added to the mixture to terminate the reaction. The reaction mixture was stripped under vacuum to remove solvent, dissolved with 50 ml of hexane, and filtered to collect the filtrate. The crude product (i.e., filtrate) was purified by column chromatography (the packing was 20 g of silica gel, the eluent was 100% hexane). The solution was then concentrated under reduced pressure to obtain a pale yellow liquid (4.7 g, yield=75.8%).

CATALYST EXAMPLE 3

Synthesis of cyclobutylidene(1-$\eta^5$-cyclopentadienyl)(1-$\eta^5$-indenyl)bis(dimethylamino) zirconium 1-Cyclopentadienyl-1-indenylcyclobutane (0.94 g, 4 mmole) obtained as in Catalyst Example 1 and Zr(NMe$_2$)$_4$ (1 g, 3.7 mmole) were placed in a 100 ml round bottle flask. 20 ml of toluene was added to the flask and the mixture was allowed to react at room temperature for 15 hours. The reaction mixture was stripped under vacuum to remove solvent and then 50 ml of pentane was added to dissolve the residue. The solution was filtered and the filtrate was then concentrated to obtain a yellow solid (1.45 g, yield=95%).

CATALYST EXAMPLE 4

Synthesis of cyclobutylidene(1-$\eta^5$-methylcyclopentadienyl)(1-$\eta^5$-indenyl)bis(dimethylamino)zirconium 1-Methylcyclopentadienyl-1-indenylcyclobutane (0.99 g, 4 mmole) obtained as in Catalyst Example 2 and Zr(NMe$_2$)$_4$ (1 g, 3.7 mmole) were placed in a 100 ml round bottle flask. 20 ml of toluene was added to the flask and the mixture was allowed to react at room temperature for 15 hours. The reaction mixture was stripped under vacuum to remove solvent and then 50 ml of pentane was added to dissolve the residue. The solution was filtered and the filtrate was then concentrated to obtain a yellow solid (1.54 g, yield=98%).

CATALYST EXAMPLE 5

Synthesis of cyclobutylidene(1-$\eta^5$-cyclopentadienyl)(1-$\eta^5$-fluorenyl)zirconium dichloride 1-cyclopentadienyl-1-fluorenylcyclobutane was prepared by similar procedures as described in Catalyst Example 1. The resulting substance (1.14 g, 4 mmole) was combined in toluene with Zr(NMe$_2$)$_4$ (1 g, 3.7 mmole) within a 100 ml round bottle flask. 20 ml of toluene was added to the flask and the mixture was allowed to react at room temperature for 15 hours for providing the metallocene amide complex. The resulting solution was then treated with 1.05 ml of trimethylsilylchloride. The resulting solution was then allowed to react at room temerature for 6 hr to privide a yellow precipitate of cyclobutylidene(1-$\eta^5$-cyclopentadienyl)(1-$\eta^5$-fluorenyl)zirconium dichloride (1.15 g, 62% yield).

The precipitating powder of the catalyst was then recrystallized over toluene to form an X-ray quality single crystalline catalyst. X-ray crystal data and structural refinement were recorded by a Nonius Kappa ccd diffractometer at 295 K. Crystal data and structure refinement for the product cyclobutylidene(1-$\eta^5$-cyclopentadienyl) (1-$\eta^5$-fluorenyl) zirconium dichloride (labeled to IC 8359) is shown in Table 2 attached. Selected bond lengths and bond angles are listed in Table 3 attached. X-ray crystal structure is shown in FIG. 1. The results clearly indicate that a novel catalyst with exceptional large bite angle (100.8°) was obtained in the system.

CATALYST EXAMPLE 6

Synthesis of cyclobutylidene(1-$\eta^5$-cyclopentadienyl)(1-$\eta^5$-indenyl)zirconium dichloride (1) 6,6-trimethylenefulvene (Catalyst A)

5 g of cyclobutanone (71 mmol) and 14.35 ml of cyclopentadiene (175 mmol) were charged in a 300 ml reaction bottle. 70 ml of CH$_3$OH was added as a solvent. Then, 8.75 ml of pyrrolidine (105 mmol) was added gradually and the mixture was stirred at room temperature for 30 minutes. Next, 6.3 ml of CH$_3$COOH (105 mmol) was added gradually and stirred for 10 minutes. 200 ml of H$_2$O and 200 ml of pentane were used for extraction. The upper pentane portion was collected. The lower water portion was further extracted with pentane three times. The collected pentane portion was dehydrated with MgSO$_4$, held still for 30 minutes, filtered, and concentrated under reduced pressure to afford a yellow liquid product (5.5 g, yield=68.9%).

(2) 1-cyclopentadienyl-1-indenylcyclobutane

Indene (5.8 g, 50 mmole) was placed in a 250 ml round bottom flask with 50 ml of THF (tetrahydrofuran). 34.3 ml (1.6 M, 55 mmole) of n-butyl lithium (n-BuLi) was added into the solution under an ice bath. The mixture turned orange red. The ice bath was removed and the mixture was stirred for 3 hours. 5.4 g of 6,6-trimethylenefulvene (46 mmole) was added gradually to the mixture. After stirring for 24 hours, 1 ml of water was added to the mixture to terminate the reaction. The reaction mixture was stripped under vacuum to remove solvent, washed with 100 ml of pentane, and filtered to remove the salt. The crude product (i.e., filtrate) was purified by column chromatography (the packing was 20 g of silica gel, the eluent was 100% pentane). The solution was then concentrated under reduced pressure to obtain a pale yellow liquid (6.96 g, yield=65%).

(3) cyclobutylidene(1-$\eta^5$-cyclopentadienyl)(1-$\eta^5$-indenyl) bis(dimethylamino)zirconium 1 g of 1-Cyclopentadienyl-1-indenylcyclobutane (4.3 mmol) obtained and Zr(NMe$_2$)$_4$ (1.06 g, 4.0 mmol) were placed in a 100 ml round bottle flask. 50 ml of toluene was added to the flask and the mixture was allowed to react for 24 hours. The reaction mixture was stripped under vacuum to remove solvent and then 20 ml of pentane was added to dissolve the residue. The solution was filtered and the filtrate was then concentrated to obtain an orange yellow solid (1.47 g, yield=89.3%).

Figure 2:
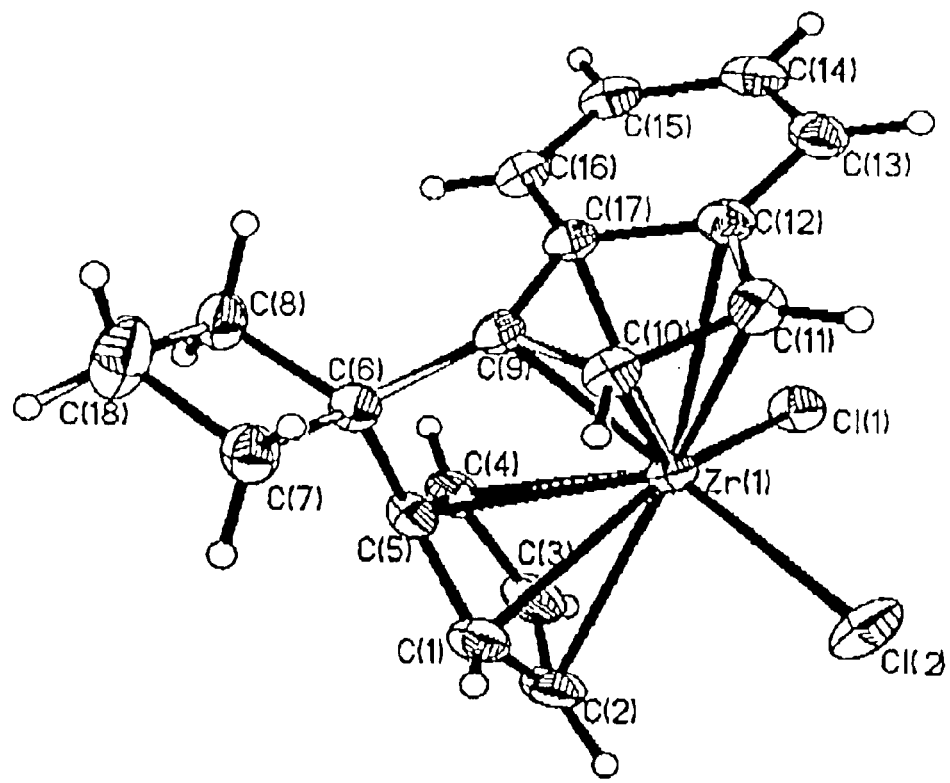
FIG. 2 is an X-ray crystal structure of the metallocene compound prepared from Catalyst Example 6 of the present invention.

(4) cyclobutylidene(1-$\eta^5$-cyclopentadienyl)(1-$\eta^5$-indenyl)-zirconium dichloride 0.5 g of cyclobutylidene(1-$\eta^5$-cyclopentadienyl)(1-$\eta^5$-indenyl)bis(dimethylamino)zirconium (1.2 mmol) was charged in a 100 ml round bottle and 20 ml of toluene was added. 0.39 g of (CH$_3$)$_3$SiCl (3.6 mmol) was added gradually at room temperature and the mixture was allowed to react for 24 hours. The reaction mixture stripped under vacuum to remove solvent and washed with pentane several times to remove excess (CH$_3$)$_3$SiCl. The pentane solution was then concentrated to obtain a pale yellow solid (0.4 g, yield=83.5%). X-ray crystal structure of the product cyclobutylidene(1-$\eta^5$-cyclopentadienyl)(1-$\eta^5$-indenyl)-zirconium dichloride is shown in FIG. 2. The results clearly indicate that a novel catalyst with exceptional large bite angle (100.44°) was obtained in the system.

CATALYST EXAMPLE 7

Synthesis of cyclopentylidene(1-$\eta^5$-cyclopentadienyl)(1-$\eta^5$-indenyl)zirconium dichloride (Catalyst B)

(1) 6,6-tetramethylenefulvene 6 g of cyclopentanone (71 mmol) and 14.35 ml of cyclopentadiene (175 mmol) were charged in a 300 ml reaction bottle. 70 ml of CH$_3$OH was added as a solvent. Then, 8.75 ml of pyrrolidine (105 mmol) was added gradually and the mixture was stirred at room temperature for 30 minutes. Next, 6.3 ml of CH$_3$COOH (105 mmol) was added gradually and stirred for 10 minutes. 200 ml of H$_2$O and 200 ml of pentane were used for extraction. The upper pentane portion was collected. The lower water portion was further extracted with pentane three times. The collected pentane portion was dehydrated with MgSO$_4$, held still for 30 minutes, filtered, and concentrated under reduced pressure to afford a yellow liquid product (8.4 g, yield=89%).

(2) 1-cyclopentadienyl-1-indenylcyclopentane

Indene (5.8 g, 50 mmole) was placed in a 250 ml round bottom flask with 50 ml of THF (tetrahydrofuran). 34.3 ml (1.6 M, 55 mmole) of n-butyl lithium (n-BuLi) was added into the solution under an ice bath. The mixture turned orange red. The ice bath was removed and the mixture was stirred for 3 hours. 6.1 g of 6,6-tetramethylenefulvene (46 mmole) was added gradually to the mixture. After stirring for 24 hours, 1 ml of water was added to the mixture to terminate the reaction. The reaction mixture was stripped under vacuum to remove solvent, washed with 100 ml of pentane, and filtered to remove the salt. The crude product (i.e., filtrate) was purified by column chromatography (the packing was 20 g of silica gel, the eluent was 100% pentane). The solution was then concentrated under reduced pressure to obtain a pale yellow liquid (7.6 g, yield=67%).

(3) cyclopentylidene(1-$\eta^5$-cyclopentadienyl)(1-$\eta^5$-indenyl) bis(dimethylamino)zirconium 1 g of 1-cyclopentadienyl-1-indenylcyclopentane (4.0 mmol) obtained and Zr(NMe$_2$)$_4$ (0.96 g, 3.6 mmol) were placed in a 100 ml round bottle flask. 50 ml of toluene was added to the flask and the mixture was allowed to react for 24 hours. The reaction mixture was stripped under vacuum to remove solvent and then 20 ml of pentane was added to dissolve the residue. The solution was filtered and the filtrate was then concentrated to obtain an orange yellow solid (1.41 g, yield=90.2%).

Figure 3:
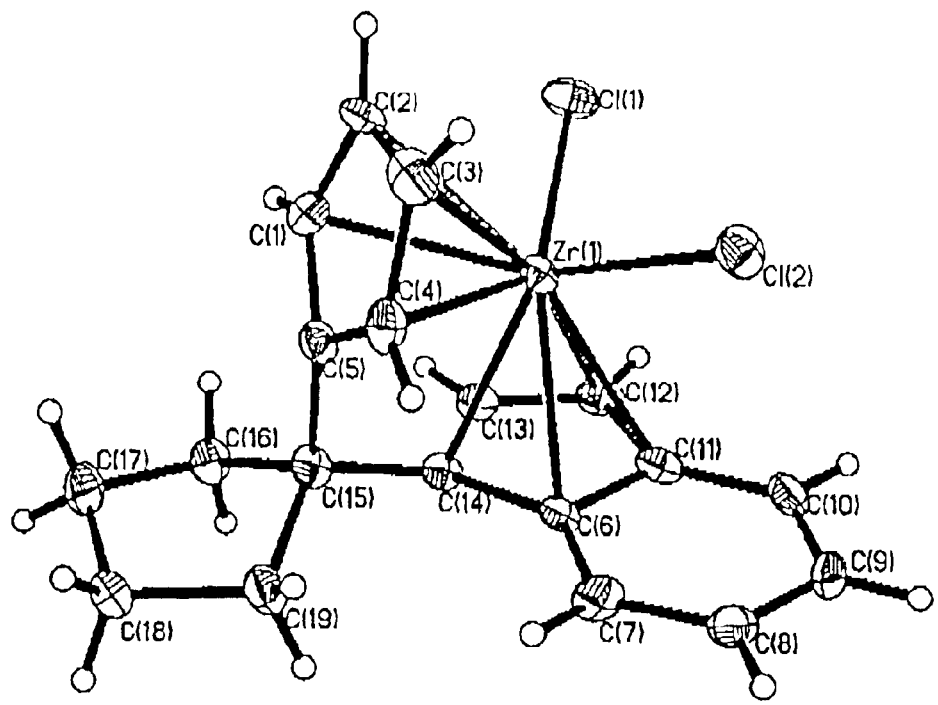
FIG. 3 is an X-ray crystal structure of the metallocene compound prepared from Catalyst Example 7 of the present invention.

(4) cyclopentylidene(1-$\eta^5$-cyclopentadienyl)(1-$\eta^5$-indenyl)-zirconium dichloride 0.51 g, of cyclopentylidene(1-$\eta^5$-cyclopentadienyl)(1-$\eta^5$-indenyl)bis(dimethylamino)zirconium (1.2 mmol) was charged in a 100 ml round bottle and 20 ml of toluene was added. 0.39 g of $(CH_3)_3SiCl$ (3.6 mmol) was added gradually at room temperature and the mixture was allowed to react for 24 hours. The reaction mixture stripped under vacuum to remove solvent and washed with pentane several times to remove excess $(CH_3)_3SiCl$. The pentane solution was then concentrated to obtain a pale yellow solid (0.42 g, yield=85.7%). X-ray crystal structure of the product cyclopentylidene(1-$\eta^5$-cyclopentadienyl)(1-$\eta^5$-indenyl)-zirconium dichloride is shown in FIG. 3. The results clearly indicate that a novel catalyst with exceptional large bite angle (101.0°) was obtained in the system.

COMPARATIVE CATALYST EXAMPLE 8

Synthesis of cycloheptylidene(1-$\eta^5$-cyclopentadienyl)(1-$\eta^5$-indenyl)zirconium dichloride (Catalyst C)

(1) 6,6-hexamethylenefulvene 8 g, of cycloheptanone (71 mmol) and 14.35 ml of cyclopentadiene (175 mmol) were charged in a 300 ml reaction bottle. 70 ml of $CH_3OH$ was added as a solvent. Then, 8.75 ml of pyrrolidine (105 mmol) was added gradually and the mixture was stirred at room temperature for 30 minutes. Next, 6.3 ml of $CH_3COOH$ (105 mmol) was added gradually and stirred for 10 minutes. 200 ml of $H_2O$ and 200 ml of pentane were used for extraction. The upper pentane portion was collected. The lower water portion was further extracted with pentane three times. The collected pentane portion was dehydrated with $MgSO_4$, held still for 30 minutes, filtered, and concentrated under reduced pressure to afford a yellow liquid product (10.6 g, yield=93%).

(2) 1-cyclopentadienyl-1-indenylcycloheptane

Indene (5.8 g, 50 mmole) was placed in a 250 ml round bottom flask with 50 ml of THF (tetrahydrofuran). 34.3 ml (1.6 M, 55 mmole) of n-butyl lithium (n-BuLi) was added into the solution under an ice bath. The mixture turned orange red. The ice bath was removed and the mixture was stirred for 3 hours. 7.4 g of 6,6-hexamethylenefulvene (46 mmole) was added gradually to the mixture. After stirring for 24 hours, 1 ml of water was added to the mixture to terminate the reaction. The reaction mixture was stripped under vacuum to remove solvent, washed with 100 ml of pentane, and filtered to remove the salt. The crude product (i.e., filtrate) was purified by column chromatography (the packing was 20 g of silica gel, the eluent was 100% pentane). The solution was then concentrated under reduced pressure to obtain a pale yellow liquid (8.6 g, yield=67.7%).

(3) cycloheptylidene(1-$\eta^5$-cyclopentadienyl)(1-$\eta^5$-indenyl)bis(dimethylamino)zirconium 1 g of 1-cyclopentadienyl-1-indenylcycloheptane (3.6 mmol) obtained and $Zr(NMe_2)_4$ (0.86 g, 3.2 mmol) were placed in a 100 ml round bottle flask. 50 ml of toluene was added to the flask and the mixture was allowed to react for 24 hours. The reaction mixture was stripped under vacuum to remove solvent and then 20 ml of pentane was added to dissolve the residue. The solution was filtered and the filtrate was then concentrated to obtain an orange yellow solid (1.25 g, yield=86%).

Figure 4:
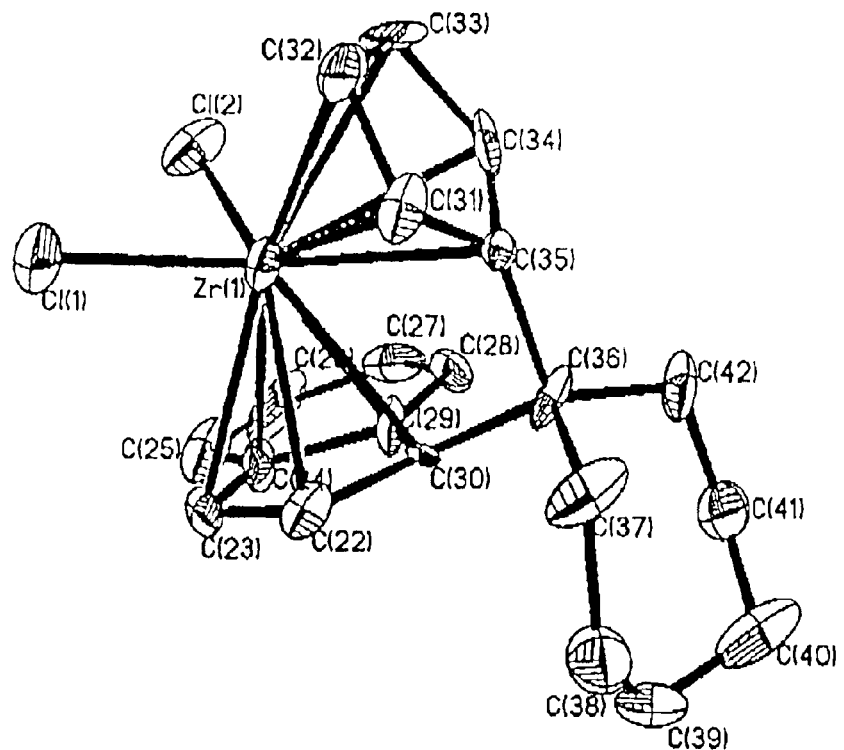
FIG. 4 is an X-ray crystal structure of the metallocene compound prepared from Comparative Catalyst Example 8 of the present invention.

(4) cycloheptylidene(1-$\eta^5$-cyclopentadienyl)(1-$\eta^5$-indenyl)-zirconium dichloride 0.5 g of cycloheptylidene(1-$\eta^5$-cyclopentadienyl)(1-$\eta^5$-indenyl)bis(dimethylamino)zirconium (1.1 mmol) was charged in a 100 ml round bottle and 20 ml of toluene was added. 0.36 g of $(CH_3)_3SiCl$ (3.3 mmol) was added gradually at room temperature and the mixture was allowed to react for 24 hours. The reaction mixture stripped under vacuum to remove solvent and washed with pentane several times to remove excess $(CH_3)_3SiCl$. The pentane solution was then concentrated to obtain a pale yellow solid (0.41 g, yield=85.2%). X-ray crystal structure of the product cycloheptylidenel(1-$\eta^5$-cyclopentadienyl)(1-$\eta^5$-indenyl)-zirconium dichloride is shown in FIG. 4. The bite angle of the product is 99.8°.

COMPARATIVE CATALYST EXAMPLE 9

Synthesis of cyclohexylidene(1-$\eta^5$-cyclopentadienyl)(1-$\eta^5$-indenyl)zirconium dichloride (Catalyst E)

(1) 6,6-pentamethylenefulvene 7 g of cyclohexanone (71 mmol) and 14.35 ml of cyclopentadiene(175 mmol) were charged in a 300 ml reaction bottle. 70 ml of $CH_3OH$ was added as a solvent. Then, 8.75 ml of pyrrolidine (105 mmol) was added gradually and the mixture was stirred at room temperature for 30 minutes. Next, 6.3 ml of $CH_3COOH$ (105 mmol) was added gradually and stirred for 10 minutes. 200 ml of $H_2O$ and 200 ml of pentane were used for extraction. The upper pentane portion was collected. The lower water portion was further extracted with pentane three times. The collected pentane portion was dehydrated with $MgSO_4$, held still for 30 minutes, filtered, and concentrated under reduced pressure to afford a yellow liquid product (8.7 g, yield=83.3%).

(2) 1-cyclopentadienyl-1-indenylcyclohexane

Indene (5.8 g, 50 mmole) was placed in a 250 ml round bottom flask with 50 ml of THF (tetrahydrofuran). 34.3 ml (1.6 M, 55 mmole) of n-butyl lithium (n-BuLi) was added into the solution under an ice bath. The mixture turned orange red. The ice bath was removed and the mixture was stirred for 3 hours. 6.7 g of 6,6-pentamethylenefulvene (46 mmole) was added gradually to the mixture. After stirring for 24 hours, 1 ml of water was added to the mixture to terminate the reaction. The reaction mixture was stripped under vacuum to remove solvent, washed with 100 ml of pentane, and filtered to remove the salt. The crude product (i.e., filtrate) was purified by column chromatography (the packing was 20 g of silica gel, the eluent was 100% pentane). The solution was then concentrated under reduced pressure to obtain a pale yellow liquid (8.3 g, yield=69%).

(3) cyclohexylidene(1-$\eta^5$-cyclopentadienyl)(1-$\eta^5$-indenyl)bis(dimethylamino)zirconium 1 g of 1-cyclopentadienyl-1-indenylcyclohexane (3.8 mmol) obtained and $Zr(NMe_2)_4$ (0.91 g 3.4 mmol) were placed in a 100 ml round bottle flask. 50 ml of toluene was added to the flask and the mixture was allowed to react for 24 hours. The reaction mixture was stripped under vacuum to remove solvent and then 20 ml of pentane was added to dissolve the residue. The solution was filtered and the filtrate was then concentrated to obtain an orange yellow solid (1.27 g, yield=84.8%).

Figure 5:
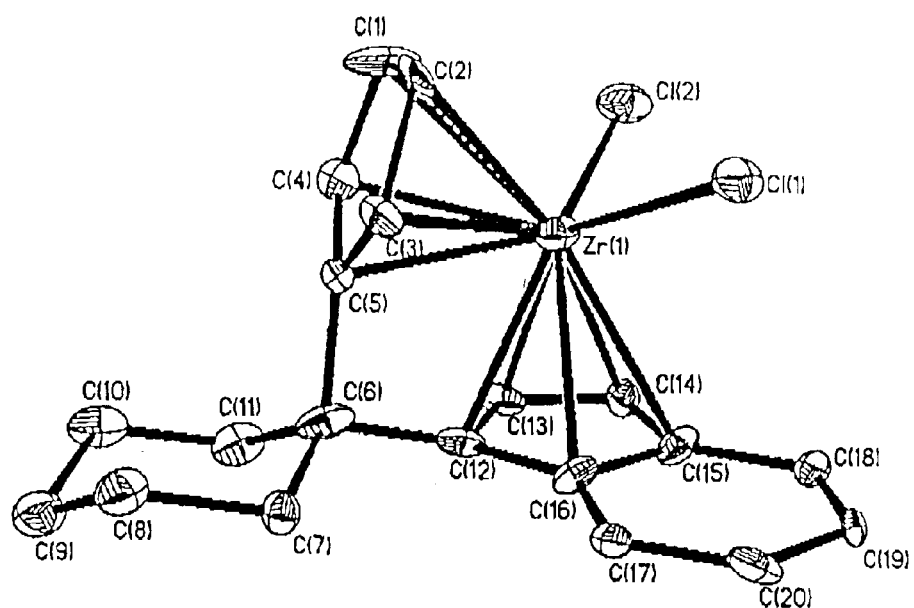
FIG. 5 is an X-ray crystal structure of the metallocene compound prepared from Comparative Catalyst Example 9 of the present invention.

(4) cyclohexylidene(1-$\eta^5$-cyclopentadienyl)(1-$\eta^5$-indenyl)-zirconium dichloride 0.53 g of cyclohexylidene(1-$\eta^5$-cyclopentadienyl)(1-$\eta^5$-indenyl)bis(dimethylamino)zirconium (1.2 mmol) was charged in a 100 ml round bottle and 20 ml of toluene was added. 0.39 g of $(CH_3)_3SiCl$ (3.6 mmol) was added gradually at room temperature and the mixture was allowed to react for 24 hours. The reaction mixture stripped under vacuum to remove solvent and washed with pentane several times to remove excess $(CH_3)_3SiCl$. The pentane solution was then concentrated to obtain a pale yellow solid (0.42 g, yield=82.5%). X-ray crystal structure of the product cyclohexylidene(1-$\eta^5$-cyclopentadienyl)(1-$\eta^5$-indenyl)-zirconium dichloride is shown in FIG. 5. The bite angle of the product is 97.3°.

Polymer Synthesis

EXAMPLE A

Synthesis of Ethylene/Norbornene Copolymer

Toluene was refluxed in the presence of sodium to remove water to a water content of less than 10 ppm. 500 g of norbornene and 88 g of dry toluene were mixed under nitrogen to obtain an 85 wt % norbornene solution.

A 500 ml reactor vessel was heated to 120° C., evacuated for 1 hour, and then purged with nitrogen gas three or four times to ensure complete removal of moisture and oxygen. Ethylene was introduced into the reactor to replace nitrogen and expelled. The procedure was repeated again. After this, 100 g of the 85 wt % norbornene solution was then charged in the reactor under a nitrogen atmosphere and the solution was stirred at a rate of 250 rpm while 4 ml of 1.49 M MAO (methyl aluminoxane) was injected into the reactor by a syringe.

The reactor temperature was adjusted to 100° C. After the temperature was stabilized, 1 mg of the metallocene complex obtained as in Catalyst Example 3 was dissolved in 1 ml of toluene in a glove box. Then, 3 ml of MAO was added in the metallocene solution for activation. After five minutes of activation, the metallocene solution was then injected into the reactor to initiate polymerization and the mixture was stirred at a rate of 750 rpm. Finally, ethylene at a pressure of 15 kg/cm² was introduced into the reactor to a saturation level in the solution and the stir rate for the mixture was maintained at 750 rpm. The reaction proceeded for 30 minutes.

After the completion of the polymerization reaction, the reaction solution was poured into an acetone solution to precipitate the product. The product was washed with acetone two or three times, filtered, and dried in vacuum oven at 80° C. for 12 hours. The obtained copolymer was 43.2 g. The results for this example are shown in Table 4.

EXAMPLES B to F

The same procedures as described in Example A were repeated to prepare various cycloolefin copolymers except that the reaction temperature, the metallocene amount, and the MAO amount were changed. The metallocene used in Examples A to F was the same. The results obtained are shown in Table 4.

COMPARATIVE EXAMPLE G (Compared with Example A)

Toluene was refluxed in the presence of sodium to remove water to a water content of less than 10 ppm. 500 g of norbornene and 88 g of dry toluene were mixed under nitrogen to obtain an 85 wt % norbornene solution.

A 500 ml reactor vessel was heated to 120° C., evacuated for 1 hour, and then purged with nitrogen gas three or four times to ensure complete removal of moisture and oxygen. Ethylene was introduced into the reactor to replace nitrogen and expelled. The procedure was repeated again. After this, 100 g of the 85 wt % norbornene solution was then charged in the reactor under a nitrogen atmosphere and the solution was stirred at a rate of 250 rpm while 4 ml of 1.49 M MAO (methyl aluminoxane) was injected into the reactor by a syringe.

The reactor temperature was adjusted to 100° C. After the temperature was stabilized, 1 mg of diphenylmethylidene (cyclopentadienyl)(9-fluorenyl) zirconium dichloride was dissolved in 1 ml of toluene in a glove box. Then, 3 ml of MAO was added in the metallocene solution for activation. After five minutes of activation, the metallocene solution was then injected into the reactor to initiate polymerization and the mixture was stirred at a rate of 750 rpm. Finally, ethylene at a pressure of 15 kg/cm² was introduced into the reactor to a saturation level in the solution and the stir rate for the mixture was maintained at 750 rpm. The reaction proceeded for 30 minutes.

After the completion of the polymerization reaction, the reaction solution was poured into an acetone solution to precipitate the product. The product was washed with acetone two or three times, filtered, and dried in vacuum oven at 80° C. for 12 hours. The obtained copolymer was 26.9 g. The results obtained are shown in Table 5.

TABLE 5

| Example | Reaction Temperature (° C.) | Ethylene Pressure (kg/cm²) | MAO (ml)/ 100 ml 85% Nb | Activity g/gZr · hr | Tg (° C.) |
| --- | --- | --- | --- | --- | --- |
| G | 100 | 15 | 7 | 1.60 × 10⁶ | 154 |
| A | 100 | 15 | 7 | 3.90 × 10⁶ | 173 |

Nb = norbornene

EXAMPLES I to K

The same procedures as described in Example A were repeated to prepare various cycloolefin copolymer having a high Tg except that the reaction temperature was set to 120° C., the reaction time was lengthened to 1 hour, the ethylene pressure was changed, and the amounts of metallocene and MAO were changed. The metallocene used in Examples I to K was the same as that used in Example A. The results obtained are shown in Table 6.

TABLE 4

| Example | Metallocene Complex (mg) | MAO (ml) | Reaction Temperature (° C.) | ethylene pressure (kg/cm²) | Yield (g) | Activity (g/gZr · hr) | Tg (° C.) |
| --- | --- | --- | --- | --- | --- | --- | --- |
| A | 1 | 7 | 100 | 15 | 43.2 | 3.9 × 10⁵ | 173 |
| B | 0.24 | 1.3 | 80 | 15 | 10.9 | 2.07 × 10⁵ | 163 |
| C | 0.23 | 1.3 | 100 | 15 | 15.3 | 5.90 × 10⁵ | 176 |
| D | 0.22 | 1.3 | 120 | 15 | 20.4 | 8.23 × 10⁵ | 185 |
| E | 0.23 | 1.3 | 140 | 15 | 26.4 | 10.2 × 10⁵ | 195 |
| F | 0.24 | 1.3 | 155 | 15 | 11.1 | 4.22 × 10⁵ | 193 |

TABLE 6

| Example | Metallocene Complex (mg) | MAO (ml) | Reaction Temperature (° C.) | ethylene pressure (kg/cm$^2$) | Yield (g) | Activity (g/gZr · hr) | Tg (° C.) |
|---|---|---|---|---|---|---|---|
| I | 1.05 | 1.3 | 120 | 3 | 27.4 | $1.17 \times 10^5$ | 292 |
| J | 0.52 | 1.3 | 120 | 5 | 24.4 | $2.14 \times 10^5$ | 245 |
| K | 0.55 | 1.3 | 120 | 7 | 34.9 | $2.87 \times 10^5$ | 232 |

COMPARATIVE EXAMPLE L (Compared with Example J)

Toluene was refluxed in the presence of sodium to remove water to a water content of less than 10 ppm. 500 g of norbornene and 88 g of dry toluene were mixed under nitrogen to obtain an 85 wt % norbornene solution.

A 500 ml reactor vessel was heated to 120° C., evacuated for 1 hour, and then purged with nitrogen gas three or four times to ensure complete removal of moisture and oxygen. Ethylene was introduced into the reactor to replace nitrogen and expelled. The procedure was repeated again. After this, 100 g of the 85 wt % norbornene solution was then charged in the reactor under a nitrogen atmosphere and the solution was stirred at a rate of 250 rpm while 4 ml of 1.49 M MAO (methyl aluminoxane) was injected into the reactor by a syringe.

The reactor temperature was adjusted to 100° C. After the temperature was stabilized, 1 mg of diphenylmethylidene (cyclopentadienyl)(9-fluorenyl)zirconium dichloride was dissolved in 1 ml of toluene in a glove box. Then, 3 ml of MAO was added in the metallocene solution for activation. After five minutes of activation, the metallocene solution was then injected into the reactor to initiate polymerization and the mixture was stirred at a rate of 750 rpm. Finally, ethylene at a pressure of 15 kg/cm$^2$ was introduced into the reactor to a saturation level in the solution and the stir rate for the mixture was maintained at 750 rpm. The reaction proceeded for 30 minutes.

After the completion of the polymerization reaction, the reaction solution was poured into an acetone solution to precipitate the product. The product was washed with acetone two or three times, filtered, and dried in vacuum oven at 80° C. for 12 hours. The obtained copolymer was 15.3 g. The results obtained are shown in Table 7.

TABLE 7

| Example | Metallocene Complex (mg) | MAO (ml) | Reaction Temperature (° C.) | ethylene pressure (kg/cm$^2$) | Yield (g) | Activity (g/gZr · hr) | Tg (° C.) |
|---|---|---|---|---|---|---|---|
| J | 0.52 | 1.3 | 120 | 5 | 24.4 | $2.14 \times 10^5$ | 245 |
| L | 1.00 | 7 | 120 | 5 | 15.3 | $9.37 \times 10^4$ | 199 |

EXAMPLES M to O

The same procedures as described in Example A were repeated to prepare various cycloolefin copolymers except that the reaction temperature was set to 120° C., ethylene pressure was changed, and the amounts of metallocene and MAO were changed. The metallocene used in Examples M to O was the same as that used in Example A. The results obtained are shown in Table 8.

TABLE 8

| Example | Metallocene Complex (mg) | MAO (ml) | Reaction Temperature (° C.) | ethylene pressure (kg/cm$^3$) | Yield (g) | Activity (g/gZr · hr) | Tg (° C.) |
|---|---|---|---|---|---|---|---|
| M | 0.22 | 1.3 | 120 | 15 | 20.4 | $8.23 \times 10^5$ | 185 |
| N | 0.49 | 3.4 | 120 | 30 | 59.0 | $10.9 \times 10^5$ | 147 |
| O | 0.47 | 3.4 | 120 | 60 | 52.5 | $10.0 \times 10^5$ | 105 |

EXAMPLES P to S

The same procedures as described in Example A were repeated to prepare various cycloolefin copolymers except that the reaction temperature, ethylene pressure, and the amounts of metallocene and MAO were changed. The metallocene used in Examples P to S was the same as that used in Example A. The norbornene used had difference concentrations in these examples. The results obtained are shown in Table 9.

TABLE 9

| Example | Metallocene Complex (mg) | MAO (ml) | norbornene concentration (%) | Reaction Temperature (° C.) | ethylene pressure (kg/cm$^2$) | Yield (g) | Activity (g/gZr · hr) | Tg (° C.) |
|---|---|---|---|---|---|---|---|---|
| P | 0.23 | 1.3 | 85 | 120 | 15 | 28.5 | 5.50 × 10$^5$ | 183 |
| Q | 0.22 | 1.3 | 50 | 120 | 15 | 30.8 | 12.4 × 10$^5$ | 156 |
| R | 0.46 | 5.2 | 85 | 100 | 60 | 70.6 | 1.36 × 10$^5$ | 103 |
| S | 0.47 | 5.2 | 50 | 100 | 60 | 33.0 | 6.30 × 10$^5$ | 66 |

EXAMPLE T

The same procedures as described in Example A were employed, except that the metallocene compound used was changed to that prepared from Example 5, the reaction temperature was 120° C., the reaction time was 10 minutes, and Al/Zr in mole was 3000. The results are shown in Table 10.

COMPARATIVE EXAMPLE U

The same procedures as described in Example T were employed, except that the metallocene compound used was changed to those used in U.S. Pat. No. 5,559,199 (dimethyl silyl-(1-indenyl)-cyclopentadienyl zirconium dichloride and U.S. Pat. No. 5,602,219 (isopropenylidene cyclopentadienyl fluorenyl)zirconium dichloride. The results are shown in Table 10.

TABLE 10

| Catalysts | Ethylene pressure (kg/cm$^2$) | Reaction time (min) | Yield (g) | Tg (° C.) | Activity g/g Zr · hr | Norbornene Conversion (%) |
|---|---|---|---|---|---|---|
| USP 5,559,199 | 15 | 10 | 4.8 | 89.66 | 3.9E+05 | 5.1 |
| USP 5,602,219 | 15 | 10 | 23.6 | 159.96 | 1.92E+06 | 25.40 |
| Catalyst prepared in Catalyst Example 5 | 15 | 10 | 32.0 | 186.15 | 2.59E+06 | 36.29 |

It can be seen from Table 10 that compared with the conventional catalyst systems, using the catalyst composition of the present invention, the obtained cycloolefin copolymer has an increased norbornene conversion and a substantially increased glass transition temperature (Tg), still maintaining high catalytic activity.

POLYMERIZATION EXAMPLE 1

Synthesis of Ethylene/Norbornene Copolymer

A 500 ml reactor vessel was purged with nitrogen three or four times. 100 ml of a norbornene solution (85 wt % in toluene) was introduced into the reactor vessel under nitrogen. The stirring rate was adjusted to 250 rpm. Ethylene was introduced into the reactor to replace nitrogen and expelled. The procedure was repeated three times. After this, 2 ml of MAO (1.49 M) was injected into the reactor at 60° C. 0.012 of catalyst A [cyclobutylidene(1-η$^5$-cyclopentadienyl)(1-η$^5$-indenyl)zirconium dichloride] prepared from Catalyst Example 6 was dissolved in 10 ml of toluene in a glove box and 0.4 ml of MAO (1.49 M) was added to 0.9 g of the catalyst solution (2.74×10$^{-6}$ mol). After five minutes of activation, the catalyst solution (containing MAO) was then injected into the reactor. When the mixture was heated to the reaction temperature (100° C.), ethylene at a pressure of 1.0 kg/cm$^2$ was introduced into the reactor to start polymerization and the stir rate for the mixture was maintained at 750 rpm. The reaction proceeded for 30 minutes.

After the completion of the polymerization reaction, the reaction solution was diluted with 100 ml of toluene and then poured into an acetone solution (containing diluted HF) to precipitate the product. The product was washed with acetone two or three times, filtered, and dried in vacuum oven for 12 hours. The obtained copolymer was 26.3 g. The results for this example are shown in Table 11.

POLYMERIZATION EXAMPLES 2–3

The same procedures as described in Polymerization Example 1 were employed except that the metallocene catalysts used were changed to Catalyst B [cyclopentylidene (1-η$^5$-cyclopentadienyl)(1-η$^5$-indenyl)zirconium dichloride] (0.95 g, 2.74×10$^{-6}$ mol) prepared from Catalyst Example 7 and Catalyst C [cycloheptylidene(1-η$^5$-cyclopentadienyl)(1-η$^5$-indenyl)-zirconium dichloride] (1.0 g, 2.74×10$^{-6}$ mol) prepared from Comparative Catalyst Example 8 respectively. The results are shown in Table 11.

COMPARATIVE POLYMERIZATION EXAMPLE 4

The same procedures as described in Polymerization Example 1 were employed except that the metallocene catalyst used was changed to Catalyst D [diphenylmethylidene(cyclopentadienyl)(9-fluorenyl)-zirconium dichloride] (1.3 g, 2.74×10$^{-6}$ mol). The results are shown in Table 11.

COMPARATIVE POLYMERIZATION EXAMPLE 5

The same procedures as described in Polymerization Example 1 were employed except that the metallocene catalyst used was changed to 0.97 g (2.74×10$^{-6}$ mol) of Catalyst E obtained from Comparative Catalyst Example 9 mol). The results are shown in Table 11.

TABLE 11

| Polymerization Example | Catalyst (member number of the bridging ring) | Product (g) | Activity (g/gZr · hr) | Tg (°C.) |
|---|---|---|---|---|
| 1 | A (four members) | 26.3 | $2.1 \times 10^5$ | 289.1 |
| 2 | B (five members) | 26.3 | $2.1 \times 10^5$ | 288.3 |
| 3 | C (seven members) | 21.5 | $1.7 \times 10^5$ | 285.8 |
| 4 | D (no ring) | 6.9 | $0.5 \times 10^5$ | 216.3 |
| 5 | E (six members) | 15.7 | $1.3 \times 10^5$ | 288.3 |

A: cyclobutylidene(1-$\eta^5$-cyclopentadienyl)(1-$\eta^5$-indenyl)zirconium dichloride
B: cyclopentylidene(1-$\eta^5$-cyclopentadienyl)(1-$\eta^5$-indenyl)zirconium dichloride
C: cycloheptylidene(1-$\eta^5$-cyclopentadienyl)(1-$\eta^5$-indenyl)zirconium dichloride
D: diphenylmethylidene(cyclopentadienyl)(9-fluorenyl)zirconium dichloride
E: cyclohexylidene(1-$\eta^5$-cyclopentadienyl)(1-$\eta^5$-indenyl)zirconium dichloride

POLYMERIZATION EXAMPLE 6

The same procedures as described in Polymerization Example 1 were employed except that the reaction temperature was changed to 120° C. and the reaction pressure was changed to 1.5 kg/cm$^2$. The results are shown in Table 12.

POLYMERIZATION EXAMPLES 7–9

The same procedures as described in Polymerization Example 6 were employed except that the metallocene catalysts used were changed to Catalyst B (0.95 g, 2.74× 10$^{-6}$ mol), Catalyst C (1.0 g, 2.74×10$^{-6}$ mol), and Catalsyt E (0.97 g, 2.74×10$^{-6}$ mol) respectively. The results are shown in Table 12.

TABLE 12

| Polymerization Example | Catalyst (member number of the bridging ring) | Product (g) | Activity (g/gZr · hr) | Tg (°C.) |
|---|---|---|---|---|
| 6 | A (four members) | 33.4 | $2.7 \times 10^5$ | 330.2 |
| 7 | B (five members) | 33.6 | $2.6 \times 10^5$ | 317.1 |
| 8 | C (seven members) | 29.4 | $2.4 \times 10^5$ | 310.3 |
| 9 | E (six members) | 19.5 | $1.6 \times 10^5$ | 309.9 |

POLYMERIZATION EXAMPLE 10

The same procedures as described in Polymerization Example 6 were employed except that the reaction time was changed to 20 minutes. The results are shown in Table 13.

POLYMERIZATION EXAMPLES 11–13

The same procedures as described in Polymerization Example 10 were employed except that the metallocene catalysts used were changed to Catalyst B (0.95 g, 2.74× 10$^{-6}$ mol), Catalyst C (1.0 g, 2.74×10$^{-6}$ mol), and Catalyst E (0.97 g, 2.74×10$^{-6}$ mol) respectively. The results are shown in Table 13.

TABLE 13

| Polymerization Example | Catalyst (member number of the bridging ring) | Product (g) | Activity (g/gZr · hr) | Tg (°C.) |
|---|---|---|---|---|
| 10 | A (four members) | 26.0 | $3.1 \times 10^5$ | 312.1 |
| 11 | B (five members) | 26.0 | $3.1 \times 10^5$ | 307.1 |
| 12 | C (seven members) | 25.7 | $3.1 \times 10^5$ | 305.7 |
| 13 | B (six members) | 14.6 | $1.7 \times 10^5$ | 310.3 |

Tables 11–13 compare the polymerization using the catalyst composition of the present invention and the conventional one. The inventive catalyst composition includes a metallocene bridged by a four- or five-member ring. The conventional catalyst composition includes a metallocene bridged by a six- or seven-member ring, or bridged by a carbon with no ring. It can be seen from Tables 11–13 that compared with the conventional catalyst systems, using the catalyst composition of the present invention, the obtained cycloolefin copolymer has an increased norbornene conversion and a substantially increased glass transition temperature (Tg), still maintaining high catalytic activity.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for preparing an olefin polymer, comprising the step of:
polymerizing (a) an olefin, or (b) at least one olefin with at least one other monomer,
under polymerizing conditions in the presence of a catalytically effective amount of a catalyst composition comprising:
(i) a metallocene compound represented by the following formula

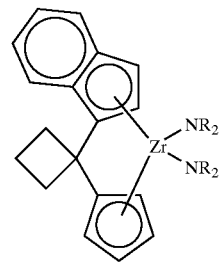

wherein R is a $C_1$–$C_{20}$ hydrocarbyl group; and
(ii) an activating cocatalyst selected from the group consisting of (1) an aluminoxane, (2) a mixture of AlR$^{11}$R$^{12}$R$^{13}$ and a borate, or (3) a mixture of AlR$^{11}$R$^{12}$R$^{13}$ and an aluminoxane,
wherein R$^{11}$, R$^{12}$, and R$^{13}$ are a $C_{1-20}$ aliphatic group or a $C_{6-10}$ aromatic group.

2. A process for preparing an olefin polymer, comprising the step of:

polymerizing (a) an olefin, or (b) at least one olefin with at least one other monomer, under polymerizing conditions in the presence of a catalytically effective amount of a catalyst composition comprising:

(i) a metallocene compound represented by the following formula

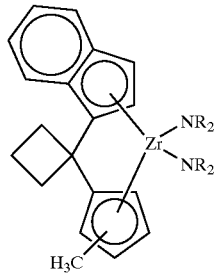

wherein R is a $C_1$–$C_{20}$ hydrocarbyl group; and (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane, wherein $R^{11}$, $R^{12}$, and $R^{13}$ are a $C_{1-20}$ aliphatic group or a $C_{6-10}$ aromatic group.

3. A process for preparing an olefin polymer, comprising the step of:

polymerizing (a) an olefin, or (b) at least one olefin with at least one other monomer, under polymerizing conditions in the presence of a catalytically effective amount of a catalyst composition comprising:

(i) a metallocene compound represented by the following formula

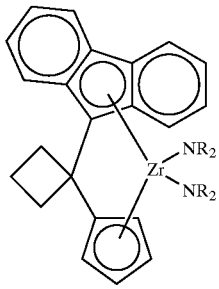

wherein R is a $C_1$–$C_{20}$ hydrocarbyl group; and (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane, wherein $R^{11}$, $R^{12}$, and $R^{13}$ are a $C_{1-20}$ aliphatic group or a $C_{6-10}$ aromatic group.

4. A process for preparing an olefin polymer, comprising the step of:

polymerizing (a) an olefin, or (b) at least one olefin with at least one other monomer, under polymerizing conditions in the presence of a catalytically effective amount of a catalyst composition comprising:

(i) a metallocene compound represented by the following formula

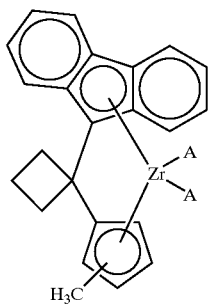

wherein A is halogen; and (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane, wherein $R^{11}$, $R^{12}$, and $R^{13}$ are a $C_{1-20}$ aliphatic group or a $C_{6-10}$ aromatic group.

5. A process for preparing an olefin polymer, comprising the step of:

polymerizing (a) an olefin, or (b) at least one olefin with at least one other monomer, under polymerizing conditions in the presence of a catalytically effective amount of a catalyst composition comprising:

(i) a metallocene compound represented by the following formula

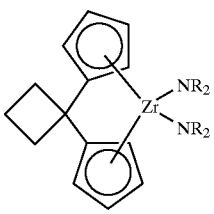

wherein R is a $C_1$–$C_{20}$ hydrocarbyl group; and (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane, wherein $R^{11}$, $R^{12}$, and $R^{13}$ are a $C_{1-20}$ aliphatic group or a $C_{6-10}$ aromatic group.

6. A process for preparing an olefin polymer, comprising the step of:

polymerizing (a) an olefin, or (b) at least one olefin with at least one other monomer, under polymerizing conditions in the presence of a catalytically effective amount of a catalyst composition comprising:

(i) a metallocene compound represented by the following formula

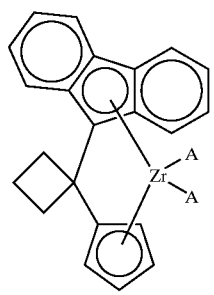

wherein A is a $C_2$–$C_{20}$ hydrocarbyl group; and
  (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane,
wherein $R^{11}$, $R^{12}$, and $R^{13}$ are a $C_{1-20}$ aliphatic group or a $C_{6-10}$ aromatic group.

7. A process for preparing an olefin polymer, comprising the step of:
  polymerizing (a) an olefin, or (b) at least one olefin with at least one other monomer,
  under polymerizing conditions in the presence of a catalytically effective amount of a catalyst composition comprising:
  (i) a metallocene compound represented by the following formula

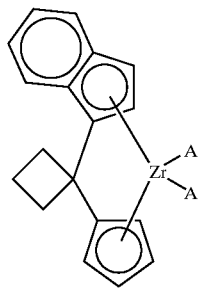

wherein A is halogen; and
  (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane,
wherein $R^{11}$, $R^{12}$, and $R^{13}$ are a $C_{1-20}$ aliphatic group or a $C_{6-10}$ aromatic group.

8. A process for preparing an olefin polymer, comprising the step of:
  polymerizing (a) an olefin, or (b) at least one olefin with at least one other monomer,
  under polymerizing conditions in the presence of a catalytically effective amount of a catalyst composition comprising:
  (i) a metallocene compound represented by the following formula

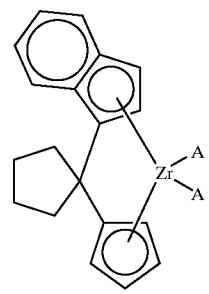

wherein A is halogen; and
  (ii) an activating cocatalyst selected from the group consisting of (1) an aluminoxane, (2) a mixture of $AlR^{11}R^{12}R^{13}$ and a borate, or (3) a mixture of $AlR^{11}R^{12}R^{13}$ and an aluminoxane,
wherein $R^{11}$, $R^{12}$, and $R^{13}$ are a $C_{1-20}$ aliphatic group or a $C_{6-10}$ aromatic group.

* * * * *